United States Patent

Fredrickson et al.

[15] 3,688,275

[45] Aug. 29, 1972

[54] FULL WORD WRAP-AROUND IN EDITING/CORRECTING DISPLAY APPARATUS

[72] Inventors: Walter G. Fredrickson, Indialantic; George M. Jones, Indian Harbour Beach; Howard A. Thrailkill, Indialantic, all of Fla.

[73] Assignee: Harris-Intertype Corporation, Cleveland, Ohio

[22] Filed: May 14, 1970

[21] Appl. No.: 37,191

[52] U.S. Cl. ..........340/172.5

[51] Int. Cl. ..........G06f 3/14

[58] Field of Search ..........340/172.5; 94/4.5

[56] References Cited

UNITED STATES PATENTS

| | | | |
|---|---|---|---|
| 3,550,091 | 12/1970 | Colgan et al | 340/172.5 |
| 3,312,953 | 4/1967 | An Wang et al | 340/172.5 |
| 3,328,764 | 6/1972 | Sorensen et al. | 340/172.5 |
| 3,307,154 | 2/1967 | Garth, Jr. et al | 340/172.5 |
| 3,299,408 | 1/1967 | An Wang et al | 340/172.5 |
| 3,248,705 | 4/1966 | Dammann et al. | 340/172.5 |

*Primary Examiner*—Paul J. Henon
*Assistant Examiner*—Sydney R. Chirlin
*Attorney*—Yount and Tarolli

[57] ABSTRACT

Apparatus for editing or proofing and correcting text displayed on the screen of a cathode ray tube. Whenever a word runs beyond the end of the line, it is automatically transferred down to the beginning of the next line for the next refresh cycle of the cathode ray tube by the present control circuitry.

18 Claims, 7 Drawing Figures

INVENTORS
WALTER G. FREDRICKSON,
GEORGE M. JONES,
& HOWARD A. THRAILKILL
BY
William J. Flynn
ATTORNEY INVENTORS
WALTER G. FREDRICKSON,
GEORGE M. JONES,
& HOWARD A. THRAILKILL
BY
William J. Flynn
ATTORNEY INVENTORS
WALTER G. FREDRICKSON,
GEORGE M. JONES,
& HOWARD A. THRAILKILL
BY
William J. Flynn
ATTORNEY INVENTORS
WALTER G. FREDRICKSON,
GEORGE M. JONES,
& HOWARD A. THRAILKILL
BY
William J. Flynn
ATTORNEY INVENTORS
WALTER G. FREDRICKSON,
GEORGE M. JONES,
& HOWARD A. THRAILKILL
BY
William J. Flynn
ATTORNEY INVENTORS
WALTER G. FREDRICKSON,
GEORGE M. JONES,
& HOWARD A. THRAILKILL
BY William J. Flynn
ATTORNEY

FULL WORD WRAP-AROUND IN EDITING/CORRECTING DISPLAY APPARATUS

This invention relates to improvements in an apparatus for editing or proofing and correcting text before the text is typset or otherwise processed.

One of the problems associated with the use of such an editing apparatus is the choice of line endings, prior to final justification of the text in the computer or automatic typesetter. The text being edited or corrected is much more readable if words are not broken and if continuity is maintained as characters are inserted or deleted.

The present invention is directed to novel control circuitry for avoiding word breaks at line endings by detecting such an undesired end-of-line condition and transferring the last word in the line down to the beginning of the next line. This word-transfer action occurs while editing or correcting entries are being made in the displayed text and, in the preferred embodiment of this invention, for any given line of the text the word-transfer action takes place inside one refresh cycle of the cathode ray tube display, so that as the editing or correcting proceeds any undesired end-of-line conditions produced are so transitory as not to be noticeable.

Accordingly, it is a principal object of this invention to provide in an editing/correcting system, having a visual display of the copy to be edited or corrected, a novel and improved arrangement for correcting a condition in which the last word in a line on the visual display runs beyond the end of the line.

Another object of this invention is to provide in such a system a novel and improved control arrangement for transferring the entire last word in a line down to the beginning of the next line if it runs beyond the line in which it originally appears.

Further objects and advantages of this invention will be apparent from the following detailed description of a presently-preferred embodiment, described with reference to the accompanying drawings in which.

SYSTEM OUTLINE

Figure 1:
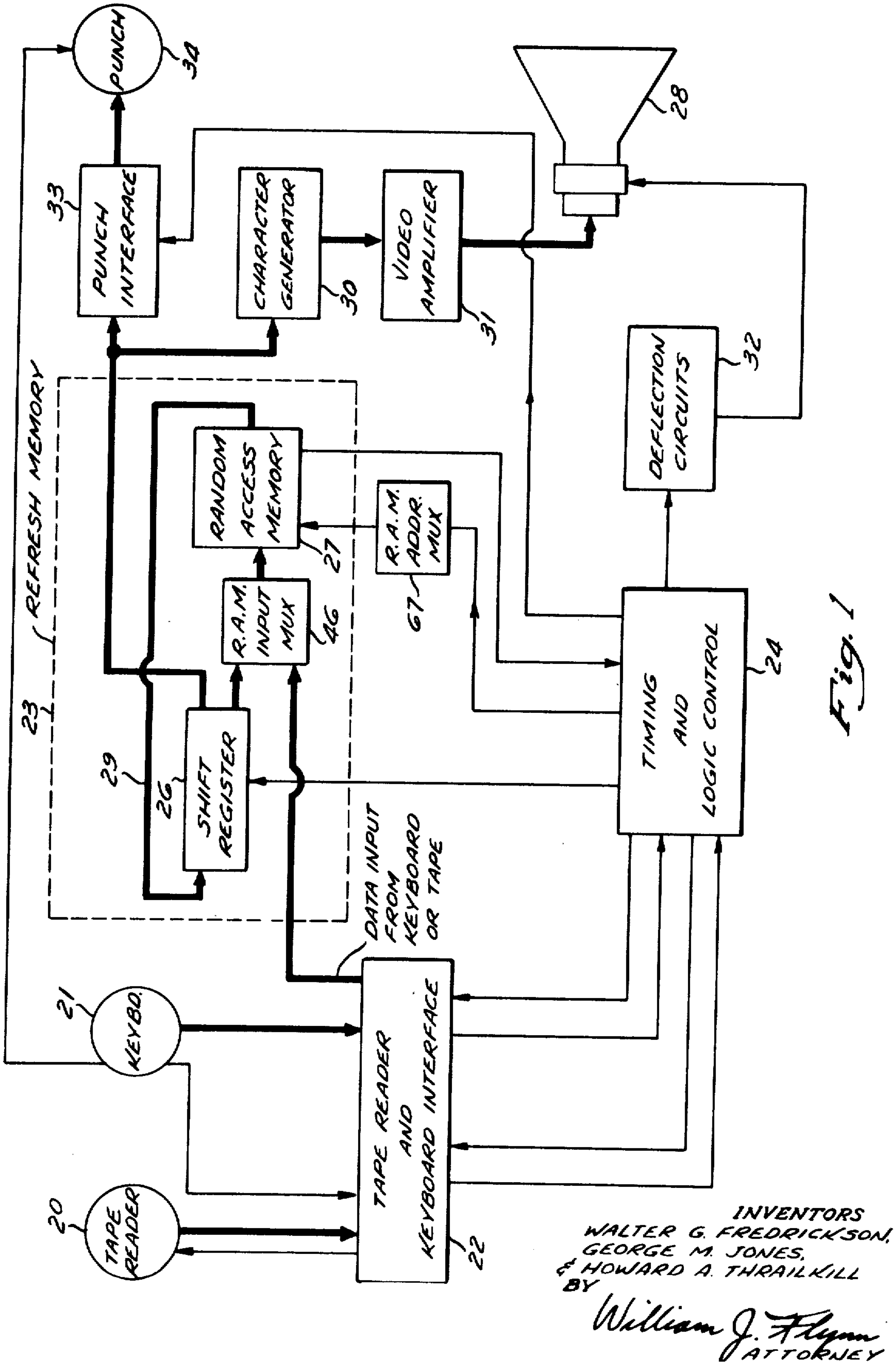
FIG. 1 is a block diagram of an editing/correcting system embodying the present invention.

Referring to FIG. 1, a complete system embodying the present invention is disclosed as comprising data input devices in the form of a tape reader 20 and a keyboard apparatus 21. The respective outputs of the tape reader and the keyboard apparatus are connected through an interface 22 to the input of a refresh memory 23 under the control of a timing and control logic section 24.

The tape reader 20 reads a conventional six-track encoded punch tape containing the unedited or unproofed text which is to be edited or corrected by an operator using the apparatus of the present invention. This text may be line-justified, such as newspaper copy provided by a wire service, such as the Associated Press or United Press International, or it may be unjustified, blind keyboarded tape which originates from locally-generated copy.

The interface 22 performs two principal functions with respect to the output from the tape reader 20:

1. it accepts six-bit characters read by the tape reader and inserts them into the refresh memory 23;
2. it "strips" (rejects) special codes, such as for line justification spaces, appearing on the input tape, so that these special codes are not transmitted to the refresh memory input.

The keyboard apparatus 21 is manually operated by the person using the present editing console to produce individual binary-coded alphanumeric characters and special function codes. The keyboard apparatus itself encodes the selected alpha-numeric character into the standard six-bit TTS code, which then transmitted by the interface 22 to the refresh memory input. Each special function key in the keyboard apparatus operates a switch which produces a D.C. level that the interface 22 then encodes before transmitting to the refresh memory input. The interface 22 contains encoding logic for this purpose, the details of which are omitted from this description as unnecessary to an understanding of the invention.

The refresh memory 23 comprises a relatively large capacity recirculating memory in the form of a dynamic shift register 26 and a random access memory 27 of much smaller capacity. All data entries into the refresh memory 23 are made into the random access memory 27 through an input multiplexer 46 under the control of an address multiplexer 67, and the data thus entered is recirculated back into the recirculating memory 26. The data read-out from the refresh memory takes place at the output of its recirculating memory 26.

The dynamic shift register 26 preferably has metal oxide semiconductor (MOS) storage elements and is capable of storing 2,000 or more eight-bit codes. The shift register continuously recirculates to enable characters to be displayed on the face of a cathode ray tube 28 at a 60 cycle per second refresh rate, as explained hereinafter.

The random access memory 27 is connected through its input multiplexer 46 to the output of the dynamic shift register 26 and it has a storage capacity of 32 eight-bit codes. The random access memory 27 together with the shift register 26 enables the unedited text input from the tape reader 20 which is being recirculated in the refresh memory to be edited in accordance with entries from the keyboard apparatus 21, such as deleting a character and/or inserting a character from the keyboard into a selected location in the text. Any one of the 32 storage addresses or character positions in the random access memory 27 can be accessed under the control of the timing and control logic section 24. That is, the editing change is actually made in the random access memory 27 and then the changed text is recirculated back through the shift register 26 via a feedback circuit 29, so that in the following cycle of operation the text displayed on the screen will include any changes made in the preceding cycle of operation. The time rate of recirculation of successive characters in the shift register 26 is not changed by the editing entries made in the random access memory 27.

The output of the shift register 26 is connected to the input of a character generator 30, which translates the encoded text output from the shift register into a serial pulse train output for turning on and off the beam of the cathode ray tube 28. The character generator 30 includes a large capacity read-only memory which may be accessed by a character code to cause a corresponding unique sequence of serial pulses to be generated. The serial pulse output from the character generator 30 is applied through a video amplifier 31 to the control grid of the cathode ray tube to turn the beam on and off in timed relationship to the vertical and horizontal deflection of the beam by deflection circuits 32 controlled by the timing and control logic section 24.

The deflection circuits 32 produce a rectangular raster scan for each individual alphanumeric character to be displayed. Preferably, the raster scan is in the form of a series of contiguous, side by side upward vertical sweeps. During each vertical sweep the beam may be turned on and off by the video amplifier 31 to produce a vertical, straight line segment, or stroke, of the character. After the completion of each vertical sweep, the beam is blanked during its rapid retrace down to the bottom of the next vertical sweep position to the right in the raster. It will be recognized that, due to the inter-character spacing, the character being "painted" in this manner does not occupy the full horizontal width of the raster in which it will appear, and therefore the beam will be blanked throughout the vertical sweeps occurring near the left and right edges of the raster.

The output of the dynamic shift register 26 also is connected to a tape punch interface 33 which, under the control of the timing and control logic section 24, may be actuated from the keyboard apparatus 21 to pass the final edited text from the output of the shift register 26 to a tape punch 34. The punch interface 33 controls the physical operations of the hole-punching elements in the tape punch 34. The edited output tape produced by the tape punch then may be used to provide the input to an automatic typesetter of known design, including, but not limited to, various types of photo-typesetters and computer-operated typesetters.

The sequencing of the events in this system and the operation of the various components so far described are under the control of the timing and control logic section 24. The timing and logic develops a master clock pulse train which is used to synchronize the rate at which the unedited text is read by the tape reader 20 and uses that clock train to determine the rate at which characters are inserted into the shift register 26, and thus determines the rate at which the tape reader must read in order to input this data. At the output end of the system, the timing and control logic 24 makes the edited text data available to the tape punch 34 at the rate at which the tape punch must accept it. The timing and control logic 24 also controls the accessing of data in the random access memory 27 for editing and other changes, and it synchronizes the analog sweep signals provided by the deflection circuits 32 to the beam deflection elements of the cathode ray tube to the rate at which the digital beam turn-on and turn-off signals are produced by the character generator 30, so that the characters will occur at the correct positions on the face of the cathode ray tube.

The timing and control logic 24 contains all of the "hard-wired" integrated-circuit logic that, in effect, constitutes the algorithms that perform the various different editing functions under the control of the keyboard apparatus 21 —i.e., how the random access memory 27 is accessed, how and when data is transferred back and forth, etc. For example, to insert a character from the keyboard apparatus 21 into the random access memory 27, a predetermined sequence of events occurs in accordance with the logic permanently wired into the timing and control logic 24. Thus, for each editing function which the operator may want to perform there is a fixed sequence of a priori instructions wired into the timing and control logic 24 which it gives to the random access memory 27 to insure that the desired editing function is performed.

FIG. 2

Figure 2:
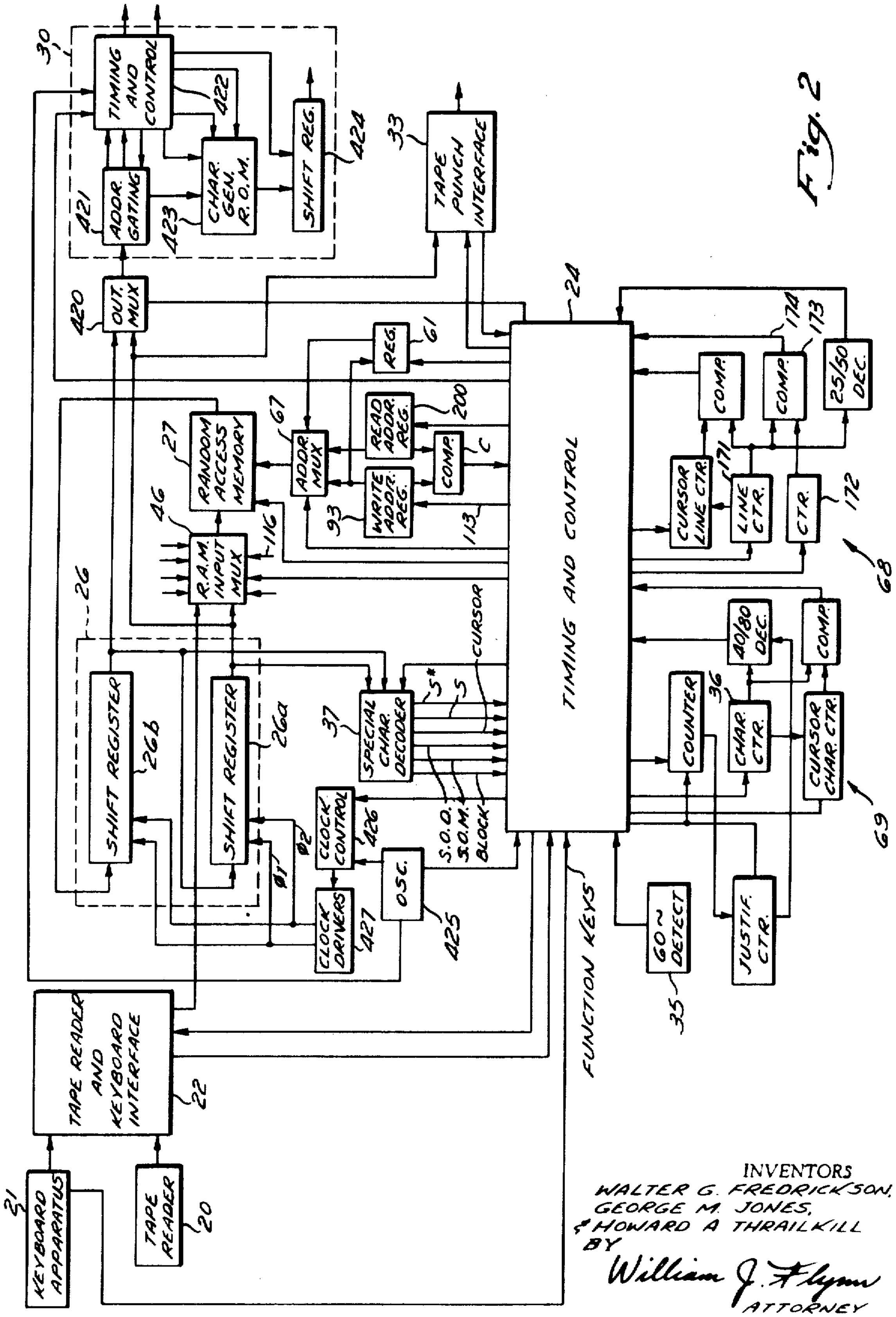
FIG. 2 shows the FIG. 1 system in more complete detail.

FIG. 2 shows in greater detail a system whose general outline has been described with reference to FIG. 1. In FIG. 2 the recirculating memory 26 is shown as having two dynamic shift registers **26*a* and 26*b*, each having a storage capacity of about 2,000 characters. At any given time, not more than half the storage capacity of the total recirculating memory 26 in FIG. 2 is made available to the cathode ray tube 28**.

Normally, the input multiplexer 46 enables the output of the shift register **26*a* into the random access memory 27. However, when the keyboard apparatus 21 or any one of several special instruction codes is enabled, the multiplexer 46 disables the normal input from the shift register into the random access memory. The special character decoder 37** is connected to the shift register to detect when any of these special codes (SOM, SOD, Block, Cursor, S (blank space) or S* (end-of-line) is present at the shift register output and to provide a corresponding enable signal to the input multiplexer 46 via the timing and control logic section 24.

Figure 3:
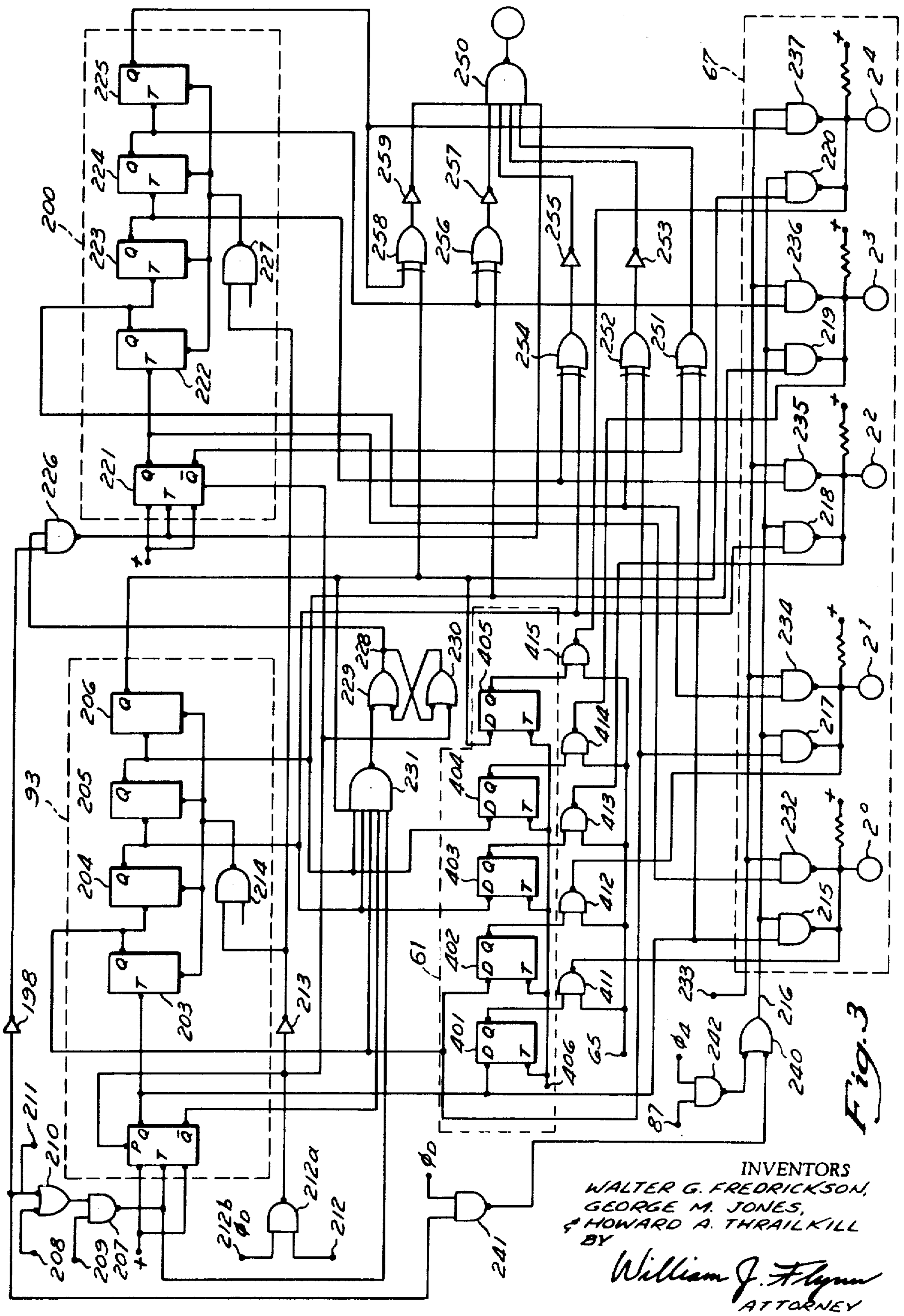
FIG. 3 shows schematically the circuitry which controls the addressing of the random access memory in the present system.

The address multiplexer 67 controls the accessing into the random access memory 27 of the write address register 93, the read address register 200 and the wrap write address register 61 as explained in detail hereinafter. A comparison circuit C, to be described in detail with reference to FIG. 3, compares the counts stored in registers 93 and 200. Normally, these counts are 30 apart, but if they coincide (as a result of a particular editing operation) this fact is detected by comparison circuit C which then provides a control signal to the timing and control logic section 24 so as to interrupt for the remainder of that particular refresh cycle whatever editing operation is then taking place. This is explained in detail with reference to FIG. 3.

An arrangement of line counters 68 and character counters 69 is associated with the timing and control signal to keep track of the cursor position, so that when this position is reached during each refresh cycle this fact is recognized to permit the desired editing operation to be performed at this time.

The output of the refresh memory 23 is connected to the input of the character generator 30 through an output multiplexer 420. The character generator itself includes address gating 421, a timing and control section 422, and read-only memory 423 and a shift register 424.

A master oscillator 425 controls the timing of actions in the tape reader and key board interface 22, the normal recirculation rate in the refresh memory 23, the timing of the actions controlled by the timing and control section 24, and the operation of the timing and control section 422 in the character generator 30. A clock control 426 and various clock drivers 427 are driven by the timing and control logic 24 to provide clock signals which control recirculation of the refresh memory 23.

The first step in conditioning the editing system for operation is to enter into the refresh memory 23 three special codes, the "start-of-memory" (SOM) code, the "start-of-display" (EOD) code, and the cursor code. These special codes are inserted automatically as soon as the system is turned on. Following this, blank space codes are inserted into the refresh memory until it is completely filled. The three special codes identify the start of the memory, and when they are detected by the timing and control logic 24 the latter operates the deflection circuits 32 to move the cathode ray tube 28. Since at this time all of the data entries in the refresh memory 23 which follow these three special codes are blanks, the cathode ray beam will remain unblanked throughout its successive raster scans until it has traversed the entire area of the screen.

Following this the refresh rate of the recirculating memory 26 and the cathode ray tube 28 is synchronized to the 60 cycle per second power supply, and data read by the tape reader 20 is written into the refresh memory, both as described in the concurrently-filed copending application of Walter G. Fredrickson, Albert W. Heitmann, George M. Jones and Howard A. Thrailkill, Ser. No. 37,177 assigned to the same assignee as the present invention.

ADDRESSING RANDOM ACCESS MEMORY

FIG. 3 shows in detail a write address register 93 and a read address register 200 through which the random access memory 27 may be accessed via the address multiplexer 67. Multiplexer 67 has five output terminals, designated $2^0$, $2^1$, $2^2$, $2^3$ and $2^4$, respectively, which are connected to corresponding terminals of the random access memory 27 so that the latter's 32 address positions may be accessed individually, depending upon the combination of binary signals on these terminals.

The write address register has five serially-connected flip-flops 202, 203, 204, 205 and 206. The input or trigger terminal T of the first flip-flop is connected to the output of an AND gate 207.

The AND gate 207 has a first input 209 which is at high potential except when the output punch 34 is being operated or during an operation when one or more characters in the refresh memory 23 are being deleted.

A second input terminal of the AND gate 207 is connected to the output of an OR gate 210, which has two inputs 208 and 211. Terminal 211 is connected to receive a clock signal which has a frequency of 168 kilocycles per second. During the normal writing in of data from the output of the shift register 26 into the random access memory 27, this clock signal on terminal 211 normally enables the AND gate 207 once during each 6 microseconds.

The second input terminal 208 of the OR gate 210 normally is at high potential so that it does not enable this OR gate, except when one or more characters are being deleted from the refresh memory.

Accordingly, when the system is operating in its normal recirculating mode, the AND gate 207 is enabled once each six microseconds, thereby operating the first flip-flop 202 in the write address register 93. Every two operations of flip-flop 202 produces a single operation of flip-flop 203, and so on in the series, so that the register 93 has $2^5$ or 32 possible states.

The flip-flop 202 has its preset terminal P connected to the output of an AND gate 212a which has one input connected to terminal 212 and a second input 212b connected to receive a phase D clock signal at a predetermined time during each 6 microsecond cycle. Terminal 212 receives a positive signal when the start-of-memory (SOM) code appears at the output of the shift register 26 and is detected by the special character decoder 37. The output of AND gate **212*a* also is connected through an inverter 213 to one input to an AND gate 214, whose other input is open-circuited and is normally at a high potential. The output of this AND gate is connected to the reset or clear terminal C of each of the remaining flip-flops 203, 204, 205 and 206 in the write address register. With this arrangement, the appearance of the SOM code in conjunction with the phase D clock signal causes flip-flop 202 to be preset of its "1" output state and causes flip-flops 203–206 to be reset to the "zero" output state, so that register 93** will have a count of 1.

The Q output terminal of flip-flop 202 is connected to one input of an AND gate 215, whose output is connected to the $2^0$ terminal. AND gate 215 has a second input from line 216, which is connected to the output of an OR gate 240. OR gate 240 has one input from the output of an AND gate 241. AND gate 241 has a first input on line 242 from the aforementioned terminal 211, which receives a square wave clock signal. AND gate 241 has a second input which receives the phase D clock signal. Accordingly, during a portion of each 6-microsecond cycle, the AND gate 241 is enabled and a high potential appears on line 216 at the same time that a high potential may or may not appear on the other input to AND gate 215, depending upon the binary condition of the first flip-flop 202 in the write address register 93.

Similarly, the Q output terminals of the remaining flip-flops 203–206 in the write address register are each connected to one input of a corresponding AND gate 217, 218, 219 or 220, whose output is connected to a respective $2^1$, $2^2$, $2^3$ or $2^4$ terminal. Each AND gate 217, 218, 219 and 220 has a second input connected to line 216.

While the write address register 93 is normally enabled into the random access memory 27 by the operation of AND gate 241, the write address register may also be enabled into the random access memory by the operation of another AND gate 242, whose output is connected to a second input of the OR gate 240. This AND gate 242 has a first input which receives a phase 4 square wave clock signal at a predetermined time during each 6-microsecond cycle. A second input to AND gate 242 is connected to terminal 87 in FIG. 4 to receive a high potential signal during an "insert character" operation, as described in detail hereinafter.

Figure 5:
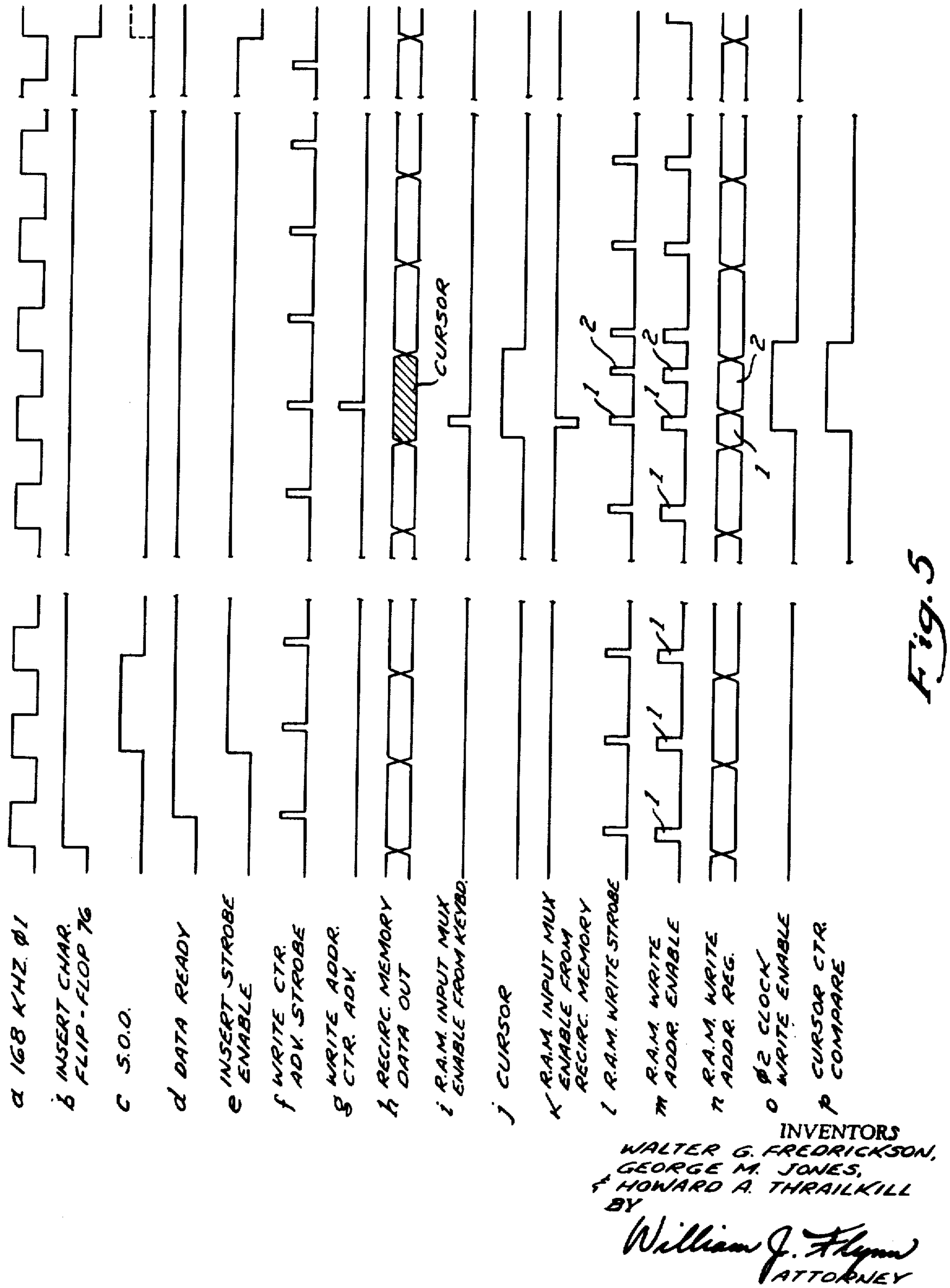
FIG. 5 is a timing diagram for the FIG. 4 circuitry.

Referring to FIG. 5, during an "insert character" operation the square wave 1 on line *m* occurs when AND gate 241 is enabled, whereas the following square wave 2 on line *m* (which occurs later in the same 6-microsecond cycle of operation) occurs when AND gate 242 is enabled.

The read address register 200 has five serially-connected flip-flops 221, 222, 223, 224 and 225. The input or trigger terminal T of the first flip-flop 221 is connected to the output of an AND gate 226. One input to this AND gate is connected through an inverter 198 to terminal 211. A second input to AND gate 226 is connected to the output terminal 228 of a flip-flop provided by two cross-connected OR gates 229 and 230. OR gate 230 has one input connected to the output of AND gate 212a, so that flip-flop 229, 230 is reset when the SOM code appears at the output of the shift register 226.

Terminal 212 also is connected, via the AND gate 212*a*, to the reset or clear terminal C of each of the flip-flops 221–225 in the read address register 200, so that this register will be reset to a count of zero in response to the appearance of the SOM code at the output of the recirculating memory 26, along with the occurrence of the phase D clock signal.

One input of the OR gate 229 is connected to the output of an AND gate 231 having six inputs. One of these inputs is connected to the output of AND gate 207; a second is connected to the $\overline{Q}$ output terminal of the first flip-flop 202 in the write address register 93; the remaining four inputs are connected to the Q output terminals of flip-flops 203–206 in the write address register. With this arrangement the AND gate 231 will be enabled in response to the 31st enabling of the AND gate 207, thereby operating the flip-flop 229, 230 to enable the AND gate 226.

Such enabling of the AND gate 226 causes the read address register 200 to begin counting up from the count (zero) to which it was reset by the appearance of the last SOM code. Consequently, the read address register 200 is now 30 counts behind the write address register 93, and this 30 count separation between these two registers will be maintained as long as no editing operation is being performed which would change it.

As hereinafter explained, an "insert character" operation would increase by one the count in the write address register, so that the count separation between the write and read address registers would become 31 (or 1 in the opposite direction). A "delete character" or other delete operation would hold back the normal counting operation of the write address register so that the count separation between the write and read address registers would become less than 30. However, in any of these modes of operation, at the beginning of the next display or refresh cycle of the cathode ray tube 28 the appearance of the start-of-memory (SOM) code would reset the write address register 93 to 1 and the read address register 200 to zero, and the normal 30 count separation between them would be resumed until changed by one of the aforementioned editing functions.

In the read address register the Q output terminal of flip-flop 221 is connected to one input of an AND gate 232, whose output is connected to the $2^0$ terminal. AND gate 232 has a second input which is connected to a terminal 233. Similarly, the Q output terminals of flip-flops 222-225 are each connected to one input of a corresponding AND gate 234, 235, 236 or 237, whose output is connected to a respective terminal $2^1$, $2^2$, $2^3$ or $2^4$. Each AND gate 234, 235, 236 or 237 has a second input connected to terminal 233.

Terminal 233 is at high potential except when the write address register 93 or the wrap write address register 61 (FIGS. 2 and 6) is being enabled into the random access memory 27. Accordingly, for most of each 6-microsecond cycle of operation, the read address register 200 is enabled into the random access memory. Suitable logic circuitry is provided for causing terminal 233 to become grounded when either the write address register 93 or the wrap write address register 61 is being enabled into the random access memory.

The AND gates 215 and 232 whose outputs are both connected to the $2^0$ terminal are both open-collector AND gates provided with an external resistor so that together they form a wired OR gate. If the output of either and gate 215 or 232 becomes grounded it causes the output of the other to become grounded also.

The same is true of the AND gates 217 and 234 which are connected to the $2^1$ terminal, the AND gates 218 and 235 which are connected to the $2^2$ terminal, the AND gates 219 and 236, which are connected to the $2^3$ terminal, and the AND gates 220 and 237 which are connected to the $2^4$ terminal.

FIG. 3 also includes circuitry for comparing, bit for bit, the respective counts in the write and read address registers 93 and 200 to provide a halt indication to the timing and control logic whenever the counts in these registers are the same, at which time the timing and control logic should discontinue any editing operations for the remainder of that refresh cycle.

This circuitry includes an AND gate 250 having six inputs. A first input to this AND gate is from the output of an exclusive OR gate 251. Gate 251 has two inputs which are connected to the Q and $\overline{Q}$ output terminals respectively of the first flip-flops 202 and 221 in the write and read address registers 93 and 200, respectively.

A second input to the AND gate 250 is from the output of an exclusive OR gate 252 through an inverter 253. Gate 252 has two inputs which are connected to the Q output terminals of the second flip-flops 203 and 222 in the respective registers.

A third input to the AND gate 250 is from the output of an exclusive OR gate 254 through an inverter 255. Gate 254 has two inputs which are connected to the Q output terminals of the third flip-flops 204 and 223 in the write and read registers, respectively.

A fourth input to the AND gate 250 is from the output of an exclusive OR gate 256 through an inverter 257. Gate 256 has two inputs which are connected to the Q output terminals of the fourth flip-flops 205 and 224 in the respective registers.

A fifth input to the AND gate 250 is from the output of an exclusive OR gate 258 through an inverter 259. Gate 258 has two inputs which are connected respectively to the Q output terminals of the fifth flip-flops 206 and 225 in the write and read registers.

The sixth input to the AND gate 250 is from the output of the AND gate 226.

With this arrangement the AND gate 250 is enabled only if there is a bit-by-bit match between the write and read address registers 93 and 200, in which case the editing operation is halted until the next appearance of the SOM code at the output of the recirculating memory 26 re-establishes the normal 30 count separation between the write and read address registers.

RAM INPUT MULTIPLEXER

Figure 7:
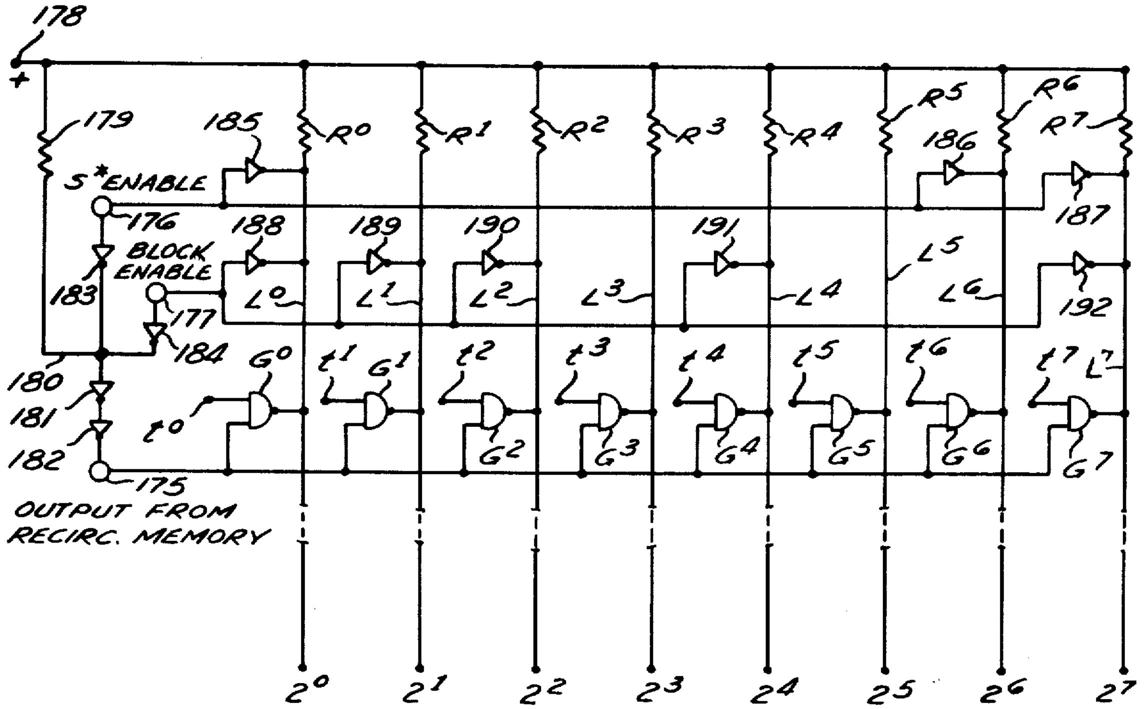
FIG. 7 is a fragmentary schematic view showing part of the input multiplexer for the random access memory in the system of FIGS. 1 and 2.

FIG. 7 illustrates enough of the circuitry in the input multiplexer 46 for the random access memory 27 to indicate the manner in which the date output from the recirculating memory 26 is disabled from entering the data input of random access memory 27 whenever it is desired to write the keyboard entry or any of several special codes into the random access memory. That is, any one of these special codes takes precedence over the normal data output from the recirculating memory into the random access memory. FIG. 7 shows the input enable terminals for just two such special codes, the S* (end-of-line) code and the block code which is to be entered whenever a "define block" operation is to be performed. However, it is to be understood that there are several other special inputs (not shown) any of which can disable the recirculating memory data output from entry into the random access memory in a manner similar to that now to be described.

Figure 6:
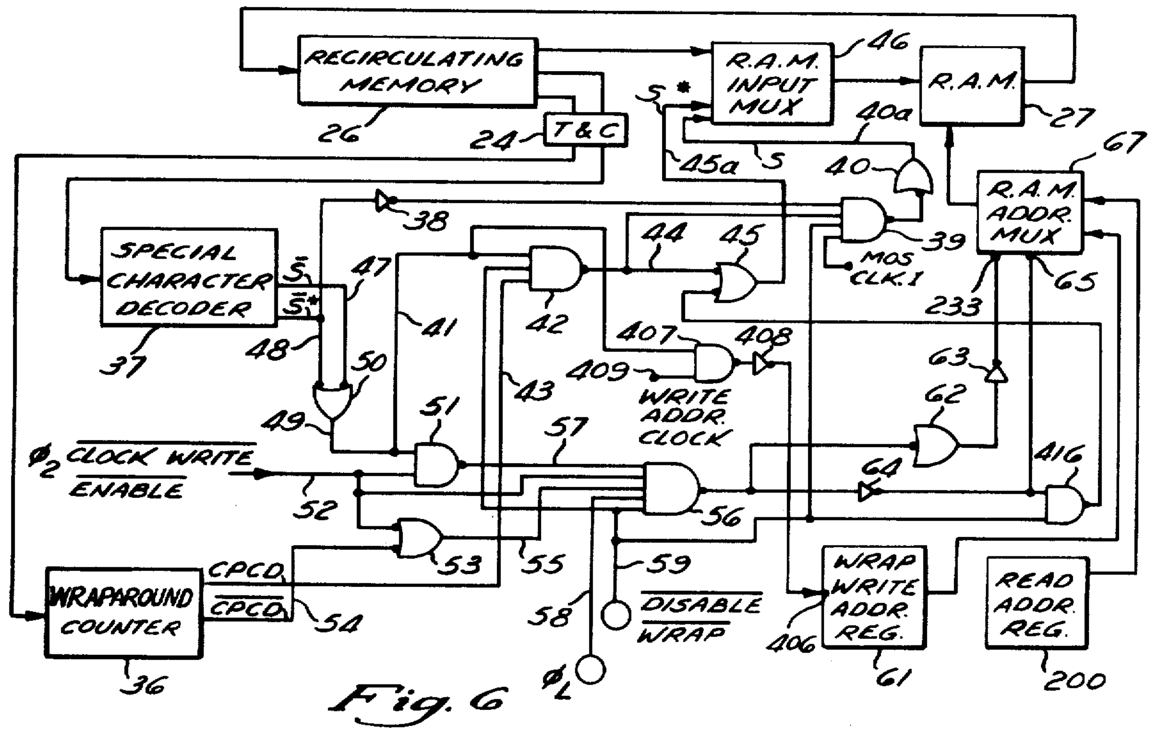
FIG. 6 illustrates schematically the "full word wrap-around" control circuitry in accordance with the present invention for correcting an undesired end-of-line condition.

Referring to FIG. 7, the input multiplexer has a plurality of input enable terminals, three of which are shown here, namely the terminal 175 for enabling the data output of the recirculating memory 26, terminal 176, which is connected to receive an S* enable signal into the random access memory from line 45*a* in FIG. 6, and terminal 177, which receives a block enable signal when the "define block" operational mode is established.

The recirculating memory enable terminal 175 is connected to one input of each of a group of AND gates, $G^0$, $G^1$, $G^2$, $G^3$, $G^4$, $G^5$, $G^6$ and $G^7$. The output terminals of these AND gates are connected directly to respective lines $L^0$, $L^1$, $L^2$, $L^3$, $L^4$, $L^5$, $L^6$, and $L^7$, which are connected to the data input terminals of random access memory 27 for the $2^0$, $2^1$, $2^2$, $2^3$, $2^4$, $2^5$, $2^6$ and $2^7$ data bits, respectively. A power supply terminal 178 is connected to these lines through respective resistors $R^0$, $R^1$, $R^2$, $R^3$, $R^4$, $R^5$, $R^6$ and $R^7$. The AND gates $G^0$–$G^7$ have respective second input terminals $t^0$ –$t^7$, each of which receives from the output of the recirculating memory 26 a signal corresponding to the binary value of the data bit which corresponds to that AND gate. For example, when the third date bit (i.e., the $2^2$ bit) in the eight-bit coded signal at the recirculating memory output is binary 1, a positive signal will be applied to input terminal $t^2$ for AND gate $G^2$, so that this AND gate will be enabled if the signal on terminal 175 also is positive.

However, terminal 175 is grounded if an enable signal is present at either of the other enable input terminals 176, 177 shown in FIG. 7. The power supply terminal 178 is connected to the recirculating memory enable terminal 175 through a resistor 179, line 180, and a pair of series-connected inverters 181 and 182. The S* enable terminal 176 is connected to line 180 through an inverter 183 which is an open-collector transistor. The block enable terminal 177 is connected to line 180 through an open-collector transistor inverter 184. In the absence of a positive signal at either terminal 176 or 177, line 180 will be at substantially the positive potential of power supply terminal 178 and therefore terminal 175 will also be positive. However, a positive signal on either terminal 176 or 177 will be inverted by the respective inverter 183 or 184 to ground line 180, thereby causing terminal 175 to be grounded. As a result, none of the AND gates $G^0$ –$G^7$ can be enabled in response to the corresponding data bits appearing at the output of the recirculating memory 26.

The S* enable terminal 176 is connected to lines $L^0$, $L^6$ and $L^7$ through respective inverters 185, 186 and 187, so that these lines will be grounded in response to the S* enable signal, while lines $L^1$, $L^2$, $L^3$, $L^4$ and $L^5$ will be positive. This particular combination of inputs to the data terminals $2^0$ –$2^7$ corresponds to the eight-bit code for S* in the present system.

The block enable terminal 177 is connected to lines $L^0$, $L^1$, $L^2$, $L^4$ and $L^7$ through respective inverters 188, 189, 190, 191 and 192, so that the binary signal values appearing on terminals $2^0$ –$2^7$ will correspond to the eight-bit "block" code when the block enable signal is present at terminal 177.

It will be understood that various other enable inputs (not shown) are connected to lines $L^0$ –$L^7$ and to line 180 in the same manner, so that whenever any of these inputs receives a positive enable signal it will:

1. disable the recirculating memory output from the data input of the random access memory 27; and
2. enable a corresponding special code into the random access memory.

INSERT CHARACTER MODE

Figure 4:
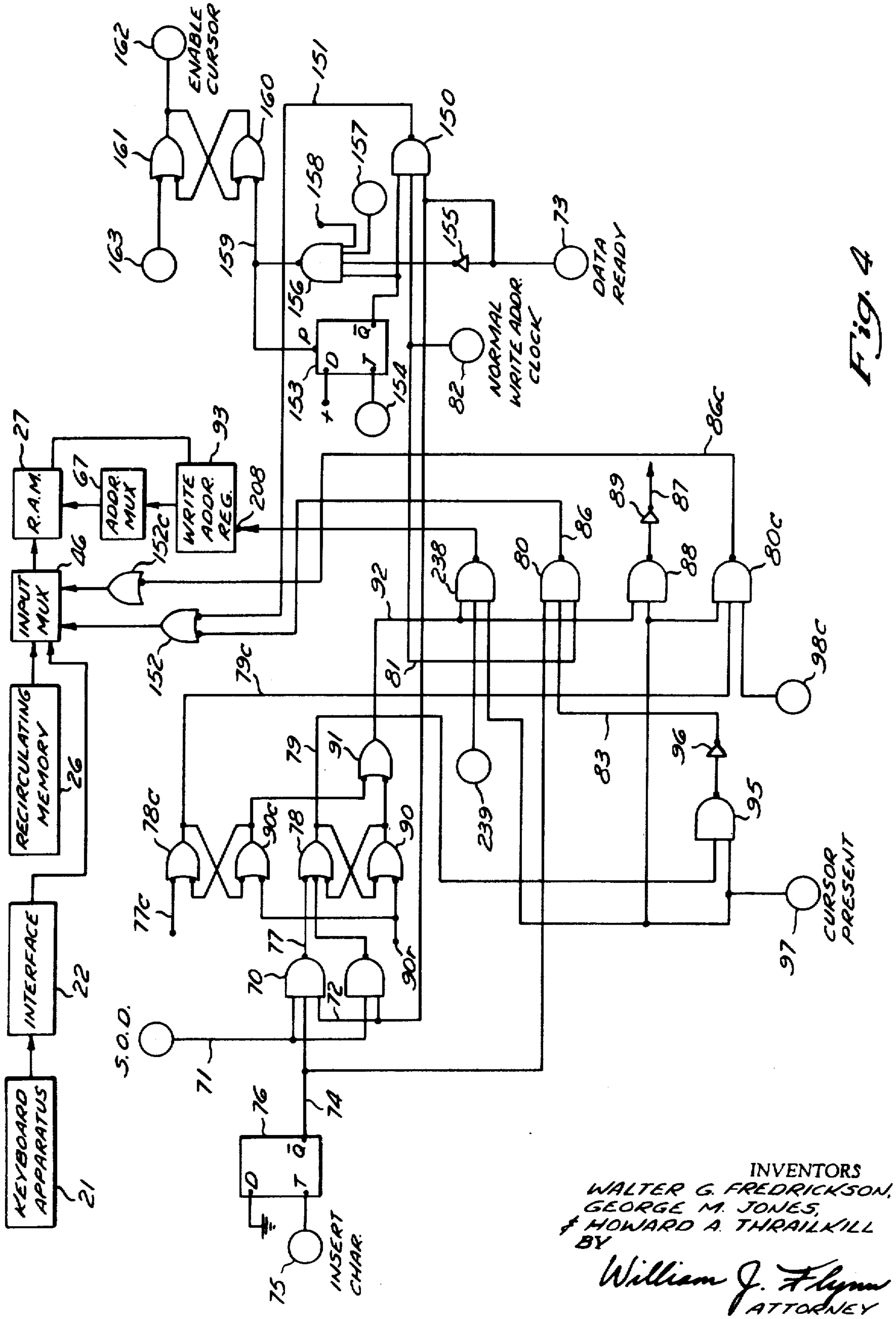
FIG. 4 shows schematically the circuitry used in the present system for inserting a character or a cursor into the text to be displayed and edited or corrected.

FIG. 4 illustrates logic circuitry in the timing and contorl section 24 which operates when a character is being inserted from the keyboard apparatus 21 into a selected location in a selected line of the text appearing on the screen of the cathode ray tube 28. FIG. 5 illustrates the timing diagrams for this mode of operation of the present apparatus.

Referring to FIG. 4, the "insert character" operation is controlled by an AND gate 70 which is enabled when the following three conditions occur:

1. The start-of-display (SOD) counter comparison appears at the output of the SOD counter comparator 173, causing a positive signal to appear on input line 71 to the AND gate 70. SOD code is detected by the SOD counter comparator 173 to provide this positive signal.
2. A "data ready" positive signal appears on a second input line 72 to the AND gate 70. This signal is applied to terminal 73 in FIG. 4 from the tape reader and keyboard interface 22 (FIG. 1) whenever any character key in the keyboard apparatus is struck.

3. A positive signal appears on the third input line 74 to the AND gate 70. This occurs in response to the actuation of an "insert character" key in the keyboard apparatus 21 which, through the interface 22, produces a signal at terminal 75 in FIG. 4 that operates flip-flop 76 to produce a positive signal on line 74.

Thus, regardless of when, in a refresh cycle of the recirculating memory 26 and the cathode ray tube 28, the insert character key and the key for the character to be inserted are depressed, the insert character operation cannot begin until the beginning of the next cycle of operation, when SOD appears, as shown at line *c* of FIG. 5.

When all three of the foregoing conditions are satisfied the AND gate 70 delivers an "insert strobe enable" signal to its output line 77. This signal enables an OR gate 78 to provide a positive output signal on line 79. This "insert strobe enable" signal is shown at line *e* of FIG. 5. OR gate 78 is cross-coupled to another OR gate 90 to constitute a flip-flop.

The "insert strobe enable" line 79 is connected to one input terminal of an AND gate 95. A second input, at terminal 97, to AND gate 95 receives a true signal when various counters which keep track of the position of the cursor indicate that the cursor is now present at the output of the recirculating memory 26. The output of AND gate 95 is connected through an inverter 96 and line 83 to one input terminal of an AND gate 80.

The AND gate 80 has a second input which is connected to the $\bar{Q}$ output line 74 from the insert character flip-flop 76. Consequently, when the insert character signal appears, it causes a positive signal to be applied to this second input of AND gate 80.

The AND gate 80 has a third input which is connected by line 81 to a normal write address clock input terminal 82, which is positive for only a small fraction of each 6-microsecond clock cycle.

With this arrangement, after the "insert character" key in the keyboard apparatus 21 has been actuated and the insert character flip-flop 76 has been operated (line *b* of FIG. 5) and the "insert strobe enable" signal (line *e* of FIG. 5) has appeared on line 79, the AND gate 80 waits for the cursor to appear at the output of the recirculating memory 26. When the cursor does appear, as shown at line *i* of FIG. 5, the AND gate 95 is enabled, thereby providing a signal to enable AND gate 80 when the narrow positive normal write address clock pulse appears at terminal 82. AND gate 80 now provides on its output line 86 a signal which is applied through an OR gate 152 to the input multiplexer 46 of the random access memory 27 to enable the selected character from the keyboard apparatus 21 into the random access memory 27. This enable pulse is shown at line *i* of FIG. 5. It occurs about 1 microsecond after the beginning of the appearance of the cursor code at the output of the recirculating memory 26, as shown at line *i* of FIG. 5. The total interval of the appearance of the cursor (and each other data output from the recirculating memory) lasts about 6 microseconds, as determined by one cycle of the phase 1 clock (line *a* of FIG. 5).

It will be evident that when the cursor code appears at the output of the recirculating memory 26 this introduces the possibility of two different inputs to the random access memory: one, the cursor itself, and two, the character selected at the keyboard. The present apparatus causes these two entries to be made in a predetermined sequence during the 6-microsecond interval normally allotted to a single data entry into the random access memory.

As described in detailed with reference to FIG. 7, the input multiplexer 46 has a second enable circuit which receives the data output from the recirculating memory 26 and which is normally enabled, but is disabled as long as there is any other enable input signal to the multiplexer. Thus, as shown in line *k* of FIG. 5, the recirculating memory input to the random access memory is disabled while the keyboard input (line *i*) is enabled.

In the present situation, therefore, the cursor code appearing at the output of the recirculating memory 26 now cannot be written into the random access memory 27.

As described in detail with reference to FIG. 3, the write address register 93 for the random access memory 27 normally is toggled one each 6-microsecond cycle of the phase 1 clock, as shown at line *n* of FIG. 5. However, in the "insert character" mode now under consideration the write address register 93 is toggled twice during the 6-microsecond cycle when the cursor code is at the output of the recirculating memory 26. The first of these two times it is toggled, as shown at 1 in line *n* of FIG. 5, the character corresponding to the key which has been actuated in the keyboard apparatus 21 is written into the next address in the random access memory 27. The second of these times the write address register is toggled, as shown at 2 in line *n* of FIG. 5, the cursor code is written into the following address in the random access memory.

This second toggling of the write address register 93 occurs in response to an output signal from an AND gate 238 in FIG. 4, whose output terminal is connected to the write address register input terminal 208 in FIG. 3.

The AND gate 238 has a first input terminal connected to the previously-mentioned terminal 97 so as to receive an enabling signal when the cursor is present.

A second input to AND gate 238 is connected to terminal 239, which receives a "write counter advance strobe" timing pulse, as shown at line *f* of FIG. 5.

A third input to AND gate 238 is provided from the output of OR gate 90 in the "insert strobe enable" flip-flop 78, 90 through OR gate 91 and line 92. This third input receives an enable signal in response to the operation of this flip-flop. Consequently, when the next "write counter advance strobe" pulse occurs (line *f* of FIG. 5), the AND gate 238 is enabled and it produces the "write address counter advance" pulse (line *g*) which is applied to the write address register 93 at its input terminal 208 to operate this register the second time during this 6-microsecond cycle of the phase 1 clock.

As already described in connection with FIG. 3, the write address register 93 normally is enabled into the random access memory 27 once each 6-microsecond cycle by the phase D clock, which enables AND gate 241. This normal enabling is indicated by the square wave pulses 1 in line *m* of FIG. 5.

Also, as already mentioned, in the "insert character" mode, during a 6-microsecond cycle the address register 93 is enabled a second time into the random access memory, as indicated by pulse 2 on line *m* of FIG. 5. This occurs in response to the enabling of an AND gate 88 in FIG. 4. The output of this AND gate is connected through an inverter 89 to line 87 which, as shown in FIG. 3, provides one input to AND gate 242. A second input to AND gate 242 is provided by the phase 4 clock pulse which occurs after the phase D clock pulse. When this phase 4 clock pulse occurs, the write address register 93 is enabled a second time into the random access memory.

The AND gate 88 has a first input connected to the previously-mentioned line 92 and a second input connected to the previously-mentioned terminal 97. Consequently, during the 6-microsecond interval when the cursor is present at the output of the recirculating memory 26, following the operation of the "insert strobe enable" flip-flop 79, 90, the AND gate 88 will be enabled and, through the invertor 89, it provides on line 87 a phase 2 clock write enable signal, as shown at line *o* of FIG. 5.

The concurrence of enabling signals on line 87 and the phase 4 input operates the AND gate 242 in FIG. 3 to enable the write address register 93 into the random access memory 27 a second time in the 6-microsecond cycle when the cursor code is present at the output of the recirculating memory 26.

After the "insert character" operation has been completed, a signal appears at terminal 90r which resets the flip-flop 78, 90.

INSERT CURSOR

The cursor may be inserted into the refresh memory 23, and therefore into the text display on the screen of the cathode ray tube 28, by an operation generally similar to the just-described "insert character" operation.

Referring to FIG. 4, a pair of cross-connected OR gates 78c and 90c constitute a flip-flop. One input 77c to this flip-flop receives an enabling signal when one of several possible "insert cursor" operations is to be performed, such as when moving the cursor from one line of text to the next line above or below. Such a cursor insertion operation is initiated from the keyboard apparatus 21. This signal on terminal 77c operates this flip-flop 78c, 90c, to produce a positive signal on line 79c, which provides one input to an AND gate 80c.

A second input to AND gate 80c is from terminal 98c, to which is applied a clock signal which occurs once each 6-microsecond cycle of the phase 1 signal shown at line *a* of FIG. 5.

A third input to AND gate 80c is from the "cursor present" terminal 97.

With this arrangement, when all three inputs to AND gate 80c are positive, it provides an output signal on line 86c which is applied through an OR gate 152c to the input multiplexer 46 of the random access memory to enable the cursor code into the random access memory.

The operation of the flip-flop 78c, 90c also causes the AND gates 238 and 88 to be enabled, so that the write address register 93 is toggled a second time during a single 6-microsecond cycle of the phase 1 clock, and the write address register 93 is enabled a second time into the random access memory. These actions take place in response to a ground signal appearing at the output of OR gate 90c of the flip-flop, which causes a positive signal to appear on the output line 92 from OR gate 91.

After the "insert cursor" operation is completed, a signal appears at terminal 90r which resets the flip-flops 78c, 90c.

OTHER EDITING OPERATIONS

The complete system in which the present invention is embodied also has provision for making various other editing operations from the keyboard apparatus, such as to "overstrike" a character (substituting in its place a character selected at the keyboard), to delete an entire paragraph of text, to delete any selected block of the text, or to delete a line of text beginning at the cursor position on that line. Such editing operations are disclosed in detail in the concurrently-filed copending U.S. Pat. application of Walter G. Fredrickson, Albert W. Heitmann, George M. Jones and Howard A. Thraillkill, Ser. No. 37,177 assigned to the same assignee as the present invention.

FULL WORD WRAP-AROUND

In accordance with the present invention, the text display on the screen of the cathode ray tube may be immediately and automatically corrected when there is not enough room for the last word in a line to be completed in that line. When this situation occurs, in accordance with the present invention, the entire last word is moved down to the beginning of the next line on the screen.

FIG. 6 shows schematically the circuitry for performing this function, with certain parts omitted for clarity.

The output of the recirculating memory 26 is connected through the timing and control logic 24 to the input of the character counter 36 and to the input of a special character decoder 37, which will detect (among other special codes) a blank space (S) code or an S* code, which is to designate the end of the last character to be displayed in the line on the screen of the cathode ray tube. That is, the S* code is to determine the end of the line and, in accordance with the present invention, it may occur before the last possible character position in the line is reached. The decoder 37 produces a ground true signal on line 47 when it detects an S code signal at the output of the recirculating memory 26. Similarly, the decoder 37 produces a ground true signal on line 48 when it detects an S* code signal at the output of the recirculating memory.

In the original text, an S code signal appears at each blank space in the text, usually between the last character in one word and the first character in the next. However, the original text does not have any S* codes. The S* codes are enabled automatically at the end of each line by the FIG. 6 circuitry, as explained hereinafter.

It will be apparent that at the end of a line of the original text, as determined by the character counter 36, two conditions are possible:

1. a blank space code appears at the end of the line, so that an S code input to decoder 37 occurs when wrap around counter 36 reaches its final count and is ready to re-cycle; or 2. a character code appears at the end of the line causing wrap around of the entire word in which that character code appears, as explained hereinafter.

Taking condition (1) first, the S code input signal to decoder 37 produces a signal on line 47 which causes an output from an OR gate 50 to be applied to one input line 41 to an AND gate 42. The wrap around counter 36, upon reaching its final count, produces a signal on second input line 43 to the AND gate 42. A third input to AND gate 42 is connected to line 59, which is positive unless a "disable wraparound" condition is established, which occurs only briefly during edit operations. Consequently, the AND gate 42 is now enabled and produces an output signal which is applied to one input line 44 to an OR gate 45, which then delivers an S* enable signal on line 45*a* to the input multiplexer 46 for the random access memory 27.

This multiplexer 46 enables various data inputs into the random access memory 27. In this case it enables the S* code as the data input into the random access memory, as previously explained in the section entitled "Ram Input Multiplexer." The S* code input to the random access memory 27 writes over, or replaces, the S code signal which appeared in the original text, and it indicates that this is the end of the line. The input multiplexer 46 has suitable circuitry, described previously with reference to FIG. 7, which disables the normal data input into the random access memory 27 from the output of the recirculating memory 26 whenever the S* enable signal appears on line 45*a*. Accordingly, while the S* code is being written into the random access memory 27 the S code now appearing at the output of the recirculating memory is disabled from being written into the random access memory and when the next character position is read out of the recirculating memory this S code has now disappeared from the refresh memory 23 as a whole.

As already explained, the data in the random access memory 27 is fed back into the recirculating memory 26, so that when the data in this line of the text again appears at the output of the recirculating memory 26 in the next complete refresh or display cycle of the refresh memory 23 and the cathode ray tube 28 (one-sixtieth of a second later), this S* code will be detected by the special character decoder 37. If the counter 36 is done, this S* code will cause an S* enable signal on line 45*a*, as described, to replace the S* code now appearing at the output of the recirculating memory 26 by a new S* code.

However, if the justification counter 36 is not done, the output of AND gate 42 will be high, and the occurrence of the S* code will enable an AND gate 39 which, through an OR gate 40, causes an S enable signal to appear on line 40*a*. This S enable signal causes the input multiplexer 46 to enable an S code as the data input into the random access memory to replace the S* code.

Thus, the system is in a continuous wraparound mode, erasing all the old S* codes and replacing them either by a new S code or a new S* code, either in the same or different locations, depending upon the wraparound counter 36.

If the previously-mentioned condition (2) occurs, then neither an S code nor an S* code will appear at the input of the special character decoder 37 when the wraparound counter 36 receives its final count, indicating that the end of the line has been reached. Under these conditions, the signals on both the $\overline{S}$ input line 47 and the $\overline{S^*}$ input line 48 to OR gate 50 will be positive, and OR gate 50 will provide a ground input signal to an AND gate 51. The other input to the AND gate 51 is high, being provided by a phase 2 clock write enable signal on line 52, which is a clock signal provided at this time from another portion of the timing and control logic 24. Consequently, the output line 57 from AND gate 51 will be positive at this time.

This positive clock signal on line 52 is also applied to one input of an OR gate 53. Another input to this OR gate is provided on the output line 54 from the character position counter 36. When this counter reaches its final count, line 54 goes to ground and the OR gate 53 provides a high output signal via line 55 to one input terminal of AND gate 56.

The AND gate 56 has a second high input via line 57 from the output of AND gate 51 and a third high input from the phase 2 clock write enable line 52. AND gate 56 has fourth input on line 58, which receives a phase L clock signal that is positive for only a small fraction of each 6-microsecond cycle. A fifth input, on line 59, to AND gate 56 is normally positive, becoming grounded only during certain edit operations.

The output of AND gate 56 is connected through an OR gate 62 and an inverter 63 to the previously-mentioned terminal 233 (FIG. 3) of the address multiplexer 67 for the random access memory 27. When this terminal is positive (which is the case as long as AND gate 56 is not enabled) the previously-described read address register 200 is enabled into the random access memory 27, as described in detail with reference to FIG. 3.

The read address register 200 receives input pulses as already explained with reference to FIG. 3.

However, during the brief portion of each 6-microsecond cycle of operation when the phase L signal on line 58 is positive and all the other inputs to AND gate 56 are positive, the AND gate 56 will be enabled, thereby grounding terminal 233 and disabling the read address register 200 from the random access memory. At this time, the output of the AND gate 56 is inverted by an inverter 64 to apply a positive enable signal to a terminal 65 of the address multiplexer 67 to enable the wrap write address register 61 into the random access memory 27 in the manner now to be described. Referring to FIG. 3, the wrap write address register comprises five flip-flops 401, 402, 403, 404, and 405, each of which is of the type that toggles in response to a positive signal on its T terminal and, when so toggled, applies the potential which is at its D input terminal to its Q output terminal. The D input terminals of flip-flops 401–405 are connected respectively to the Q output terminals of the corresponding flip-flops 202–206 in the write address register 93. Consequently, when a positive signal is applied to terminal 406, which is connected to the T input terminals of flip-flops 401–405, the potentials at the Q output terminals of the write address register flip-flops 202–206 will now appear at the Q output terminals of the corresponding flip-flops 401–405 in the wrap write address register register 61.

A positive signal appears on terminal 406 when an S or an S* code appears at the output of the recirculating memory 26 and the write address clock is positive. As shown in FIG. 6, terminal 406 of the wrap write address register 61 is connected to the output of an AND gate 407 through an inverter 408. One input to this AND gate is connected to line 41, so that it receives a positive signal when either an S code or an S* code appears at the output of the recirculating memory 26. A second input terminal 409 for AND gate 407 receives a positive write address clock once each 6 microsecond cycle.

Accordingly, each time an S or S* code appears its address is transferred from the write address register 93 into the wrap write address register 61 until the next S or S* code appears.

The Q output terminals of flip-flops 401–405 in the wrap write address register 61 are connected to the inputs of respective AND gates 411–415, each of which has a second input connected to terminal 65. The outputs of these AND gates are connected respectively to the $2^0$, $2^1$, $2^2$, $2^3$ and $2^4$ output terminals of the address multiplexer 67 for the random access memory 27. It will be evident, therefore, that the AND gates 411–415 are part of this address multiplexer. Input terminal 65 receives a positive wrap write address clock when AND gate 56 is enabled, as described.

At the same time, the S* code is enabled into the data input of the random access memory 27 in response to the enabling of an AND gate 416 (FIG. 6) whose output is connected through the OR gate 45 to line 45*a*. One input to AND gate 416 is connected to the normally positive terminal 59. A second input to AND gate 416 is connected to the output of AND gate 56 through inverter 64. Consequently, when AND gate 56 is enabled, as described, AND gate 416 will be enabled and, through OR gate 45, it will provide an S* enable input on line 45*a* to the input multiplexer 46 for the random access memory 27.

Accordingly, as the data is read out of the recirculating memory 26 the wrap write address register 61 stores the address of each S or S* code in succession. When the end of the line is reached (with no S or S* code present there), register 61 will be storing the address of the last S or S* code which appeared in this line. At the end of this line the AND gate 56 is enabled, as described, so that the address multiplexer 67 now enables the wrap write address register 61 into the random access memory 27. Thus, the address of the last S or S* code which appeared in this line is enabled into the corresponding address of the random access memory 27. At the same time the S* code is enabled via input multiplexer 46 to the data input of the random access memory 27. In effect, therefore, the random access memory 27 is interrogated to locate the address therein of the last S code which occurred in this line of text and then the S* code now activated at the input multiplexer 46 is enabled into this address in the random access memory.

Consequently, the last S code signal which appeared in this line of text is replaced now in the random access memory 27 by an S* (end-of-line) signal. From the random access memory this S* code is fed back into the recirculating memory so that during the next refresh cycle of the cathode ray tube 28 and the refresh memory 23 (one-sixtieth second later) the retrace of the cathode ray beam to begin displaying the next line of text will be initiated by the appearance at the output of the recirculating memory 26 of this S* code, which is now located in the last blank space in the present line of text (which theoretically may be anywhere within the 32 character spaces preceding the last character space in this line of the original text). That is, in the modified text the line is ended after the last word which can be completely accommodated in this line, and the following word (which would extend beyond the end of this line) now begins at the beginning of the next line on the screen of the cathode ray tube 28.

It is understood that the detection of the last S code in the line and its replacement by an S* code in the random access memory does not affect the cathode ray tube display which takes place during the refresh cycle when the detection takes place. That is, by the time the last S code in the line is "written over" by the S* code in the random access memory, this line has already been displayed, so that full-word wrap-around in the visual display cannot take place until the next refresh cycle.

In the refresh cycle which follows the detection of the last S code in the line and its replacement in the random access memory by an S* code, the appearance of this S* code at the output of the recirculating memory 26 is detected by the special decoder 37, which now provides a control signal input to the timing and control logic section 24 for causing the video amplifier 31 to blank the cathode ray beam and for causing the deflection circuits 32 to produce a horizontal retrace of the beam over to the beginning of the next line down on the screen of the cathode ray tube.

It should be understood that this full word wraparound operation can occur automatically during any editing operation which makes it necessary. There is no need to interrupt the editing operation itself in order to achieve the full word wraparound action.

From the foregoing it will be evident that the control circuitry just described is capable of correcting the end-of-line text display automatically and quite rapidly (one-sixtieth second later) after determining that a graphic character word is running over the end of the line. That is, if the last space in the line is not a blank, this fact will be detected and automatically the entire last word in this line is shifted down to the beginning of the next line, where it will appear in the next refresh cycle. This quick response is possible, in the particular circuitry disclosed, because of the novel operation of the wrap write address register 61 in storing the address of the last blank space code, so that the end-of-line (S*) code can be enabled immediately into the corresponding address in the random access memory 27 so as to correct the display in the next refresh cycle (one-sixtieth second later) following the cycle in which the undesired end-of-line condition was detected.

While a presently-preferred embodiment of this invention has been disclosed in detail, it is to be understood that it is susceptible of other embodiments without departing from the scope of the invention. For example, the present full word wrap-around circuitry may be associated with a refresh memory different from the one disclosed, such as a magnetic core memory.

We claim:

1. In an editing apparatus, visual display means for displaying words and text material by lines, said visual display means having a maximum line length for display purposes and comprising decoder means for receiving coded data including graphic character codes, interword space codes and end-of-line codes to effect the beginning of a new line, memory means for storing coded text material to be presented to said visual display means to provide a line display of the material comprising means for cyclically accessing said coded data to sequentially output the codes to said decoder during each cycle, editing means for changing portions of the material being displayed including means for selectively inserting or deleting codes from said memory to change a portion of the material being displayed, said editing means including first means for inserting end-of-line codes to terminate a line at an interword space within said maximum line length and operating during refresh cycles on a revision of line length to change the location of said end-of-line codes to a different interword location to maintain the ending of a line at an interword space with changes in line length due to insertion or deletion.

2. In an editing apparatus as defined in claim 1 wherein said editing means comprises means to change location of coded data in said memory means on deletion of material to close blank spaces and said first means comprises means inserting an end-of-line code at the last available interword space location for the material when displayed in lines of maximum length.

3. In an editing apparatus as defined in claim 1 wherein said first means comprises means for deleting the end-of-line codes after each cycle and for reinserting end-of-line codes for the next cycle.

4. In an editing apparatus as defined in claim 1 wherein said first means comprises means for counting character codes and space codes to measure line length, register means for storing a memory address of the last space code and means for changing the last space code to an end-of-line code upon a maximum line count occurring at a character code.

5. In an editing apparatus as defined in claim 4 wherein said first means comprises means for changing the end-of-line codes after each cycle to interword space codes and for reinserting end-of-line codes at the proper locations for the text material to be displayed.

6. In a method of displaying lines of text material in an editing system in which coded text material including character codes and interword space codes are repetitively presented in sequence to a decoder for the visual display apparatus to progressively generate the lines of text material on the display with the lines of text material having a maximum length and with the characters being separated into words by the interword space codes, the steps of sequentially presenting the coded data to the decoder to progressively generate a plurality of lines of text material on the display in a cycle, terminating the end of each line with a whole word by inserting end-of-line designations into the coded data for the last available interword space which would occur on the line and terminating the visual display to start a new line in response to the end-of-the line code, deleting the end-of-line codes at the end of each refresh cycle thereafter and reinserting the end-of-the line codes to accommodate any changes in line length caused by changes in portions of the material being presented.

7. In an editing or proofing and correcting apparatus having visual display means for displaying successive lines of characters and blank spaces in repetitive refresh cycles, and a refresh memory for presenting character codes and blank space codes to said visual display means in the order of their appearance thereon, means for automatically inserting in said memory an end-of-line code in place of the last blank space code in each line;

and means responsive to each end-of-line code presented by the refresh memory to said visual display means for beginning a new line on said visual display means.

8. An apparatus according to claim 7, wherein said apparatus further comprises:

an input multiplexer controlling the recirculation of the data in said refresh memory, said multiplexer having means for normally recirculating back to the memory input the codes which are presented to said visual display means, and said multiplexer having means operative at the end of each line for disabling the recirculation of the last blank space code in the line and for enabling an end-of-line code into the memory in place of said last blank space code in the line.

9. An apparatus according to claim 7, and further comprising means for making selected data changes in the memory to change accordingly the display on said visual display means without interrupting the operation of said means for inserting an end-of-line code and said means responsive to each end-of-line code for beginning a new line.

10. An apparatus according to claim 9 wherein said means for inserting an end-of-line code operates in each refresh cycle to delete the end-of-line codes of the previous refresh cycle and to insert the end-of-line codes in the last available interword blank space on a line for the material to appear in the next refresh cycle.

11. In an editing apparatus as defined in claim 7 wherein said first means comprises means for changing the end-of-line codes after each cycle to interword space codes and for reinserting end-of-line codes at the proper locations for the text material to be displayed.

12. In an editing apparatus having visual display means for providing a cyclically refreshed display of successive lines of graphic character words and blank spaces between words, and a refresh memory operative to present repetitively to said visual display means the codes for graphic characters and blank spaces in the order of their appearance on said visual display means, first means operatively associated with said memory for detecting in each refresh cycle the location of the last blank space code in each line of data to be displayed in the subsequent cycle;

and second means for ending each line in the next refresh cycle at the location of the last blank space therein and for moving down to the beginning of the next line any characters which followed said last blank space in the line in which the latter appears.

13. An apparatus according to claim 12, wherein said apparatus further comprises:

a counter which counts the positions for characters and blank spaces in each line and which re-cycles after reaching a count which corresponds to a predetermined number of said positions in a line;

means for detecting the blank space codes as they are read out of the memory and into said visual display means, storage register means for storing the memory address of each blank space code in a line until the next blank space code appears at the output of the memory;

said counter being operatively connected to said storage register means to enable the address of the last blank space code therein into the memory when the counter reaches its count for re-cycling;

and means operative when the counter reaches said count to enable an end-of-line code into the memory at the address determined by said storage register means to replace in the memory the last blank space code which appeared in this line.

14. An apparatus according to claim 13, wherein:

said refresh memory comprises a dynamic shift register and a random access memory having a capacity substantially smaller than that of said shift register;

and further comprising:

an input multiplexer connected between the output of said shift register and the data input of said random access memory;

said random access memory having its output connected back to the input of said shift register;

and an address multiplexer for said random access memory connected to said storage register means to enable the address of the last blank space code into the random access memory when the counter reaches its count for re-cycling;

and wherein said means to enable an end-of-line code into the memory is connected to said input multiplexer.

15. An editing apparatus according to claim 14, and further comprising:

means for detecting a blank space code at the end of a line;

and means responsive to said detecting means for enabling said end-of-line code from said input multiplexer into the random access memory in place of said blank space code at the end of said line.

16. An editing apparatus according to claim 14, and further comprising:

a keyboard apparatus for making selected changes in the display on said visual display means;

and means for entering the selected changes from said keyboard apparatus into the input multiplexer without interrupting the enabling of an end-of-line code in place of the last blank code in each line for correcting any end-of-line overrun caused by such changes.

17. In an apparatus having a cathode ray tube, a character generator for operating said cathode ray tube to display successive lines of characters on its screen in repetitive refresh cycles, and a refresh memory containing character codes and blank space codes and operative to present the latter to said character generator in the order of, and in synchronism with, their appearance on the screen of the cathode ray tube, the improvement which comprises:

storage register means for storing in succession the respective addresses in the refresh memory of blank space codes in the line then being presented to said character generator;

and means operative when the last blank space code in said line is not at the end of the line for enabling an end-of-line code into the refresh memory at the address of said last blank space code in said register means to cause all characters whose codes followed said last blank space code in said line to be displayed in the next line on the screen of the cathode ray tube in a subsequent refresh cycle.

18. In an apparatus according to claim 17, the apparatus further comprising:

means for detecting a blank space code at the end of a line;

and means responsive to said detecting means for replacing in the memory said last blank space code at the end of said line with an end-of-line code.

19. In an editing or proofing apparatus as defined in claim 12 wherein said successive lines have a maximum length and the apparatus includes means for modifying the data in said memory including the location of the last blank space code on a line of maximum length and wherein said first means comprises means for effecting the storing of end-of-line data to indicate the location of each last blank space code on a line of maximum length, and line length means operative in each refresh cycle during editing operations to change said end-of-line data when the location of said last blank space on a line is changed by an editing operation.

* * * * *